United States Patent [19]

Minakuchi

[11] Patent Number: 5,153,865
[45] Date of Patent: Oct. 6, 1992

[54] AUTOMATIC GAIN CONTROL APPARATUS

[75] Inventor: Tadashi Minakuchi, Tokyo, Japan

[73] Assignee: Asahi Kogaku Kogyo Kabushiki Kaisha, Tokyo, Japan

[21] Appl. No.: 450,681

[22] Filed: Dec. 14, 1989

[30] Foreign Application Priority Data

Dec. 14, 1988 [JP] Japan .................. 63-315953

[51] Int. Cl.$^5$ .................................. G11B 7/00
[52] U.S. Cl. ..................... 369/44.28; 369/44.29
[58] Field of Search ............ 369/32, 44.28, 44.29, 369/44.31, 44.34, 44.35, 44.36

[56] References Cited

U.S. PATENT DOCUMENTS

| | | | |
|---|---|---|---|
| 4,663,751 | 5/1987 | Kaku et al. | 369/44.34 |
| 4,700,334 | 10/1987 | Shinkai | 369/44.28 |
| 4,849,953 | 7/1989 | Nomura et al. | 369/44.28 |
| 4,959,823 | 9/1990 | Getreuer et al. | 369/44.34 |
| 5,003,523 | 3/1991 | Wachi et al. | 369/44.34 |

Primary Examiner—Donald McElheny, Jr.
Attorney, Agent, or Firm—Sandler, Greenblum & Bernstein

[57] ABSTRACT

A playback signal from an optical disk includes a track cross component which is produced when a head traverses tracks on the disk and a recorded area component produced when the head passes an area on the tracks on which data is recorded. The recorded area component is especially affected by a high frequency signal. A control signal which includes the recorded area component but not the track cross component is generated by adjusting the high frequency signal. A gain of a tracking servo control is controlled by the control signal.

21 Claims, 14 Drawing Sheets

TRACK DIRECTION

TRACK DIRECTION

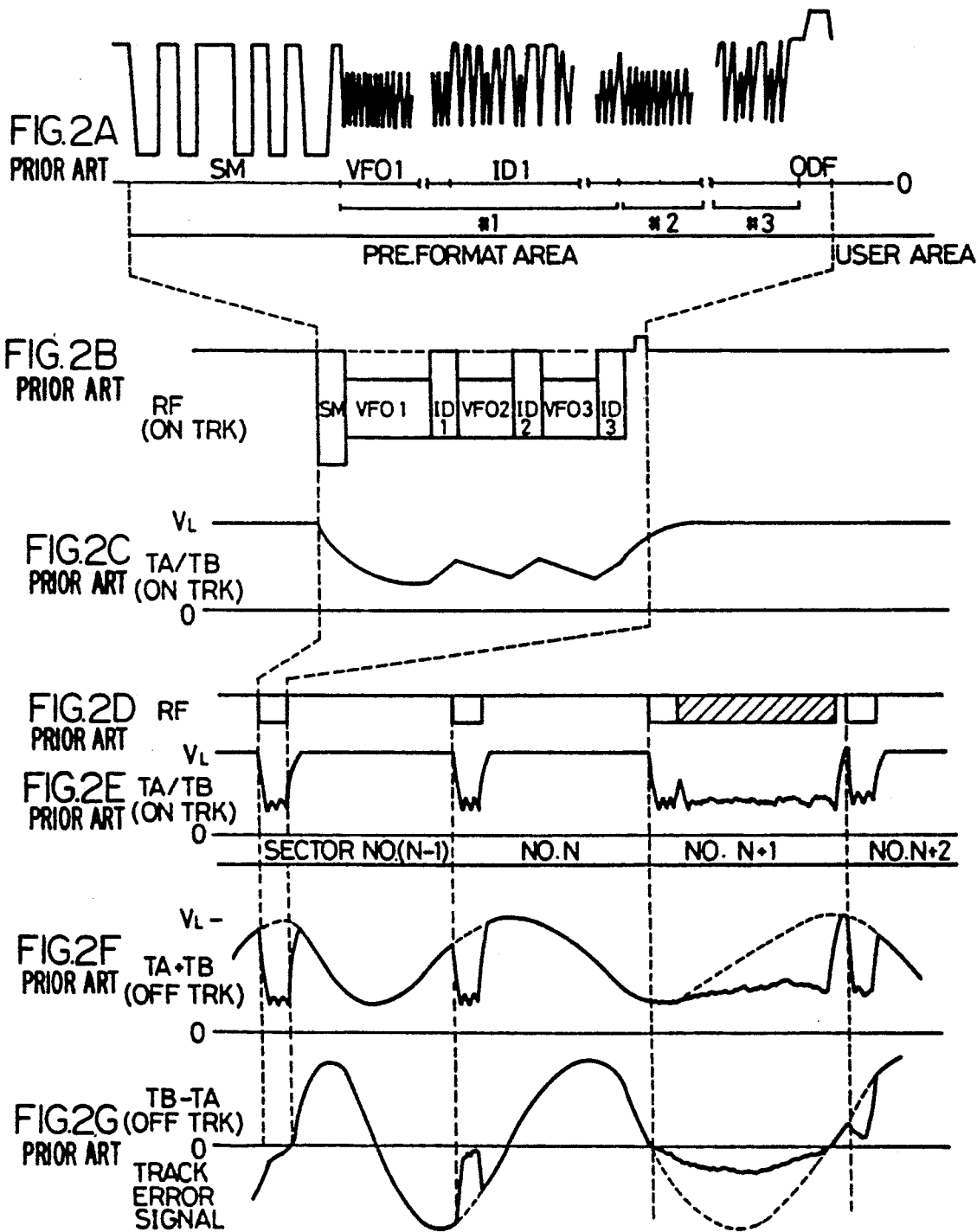

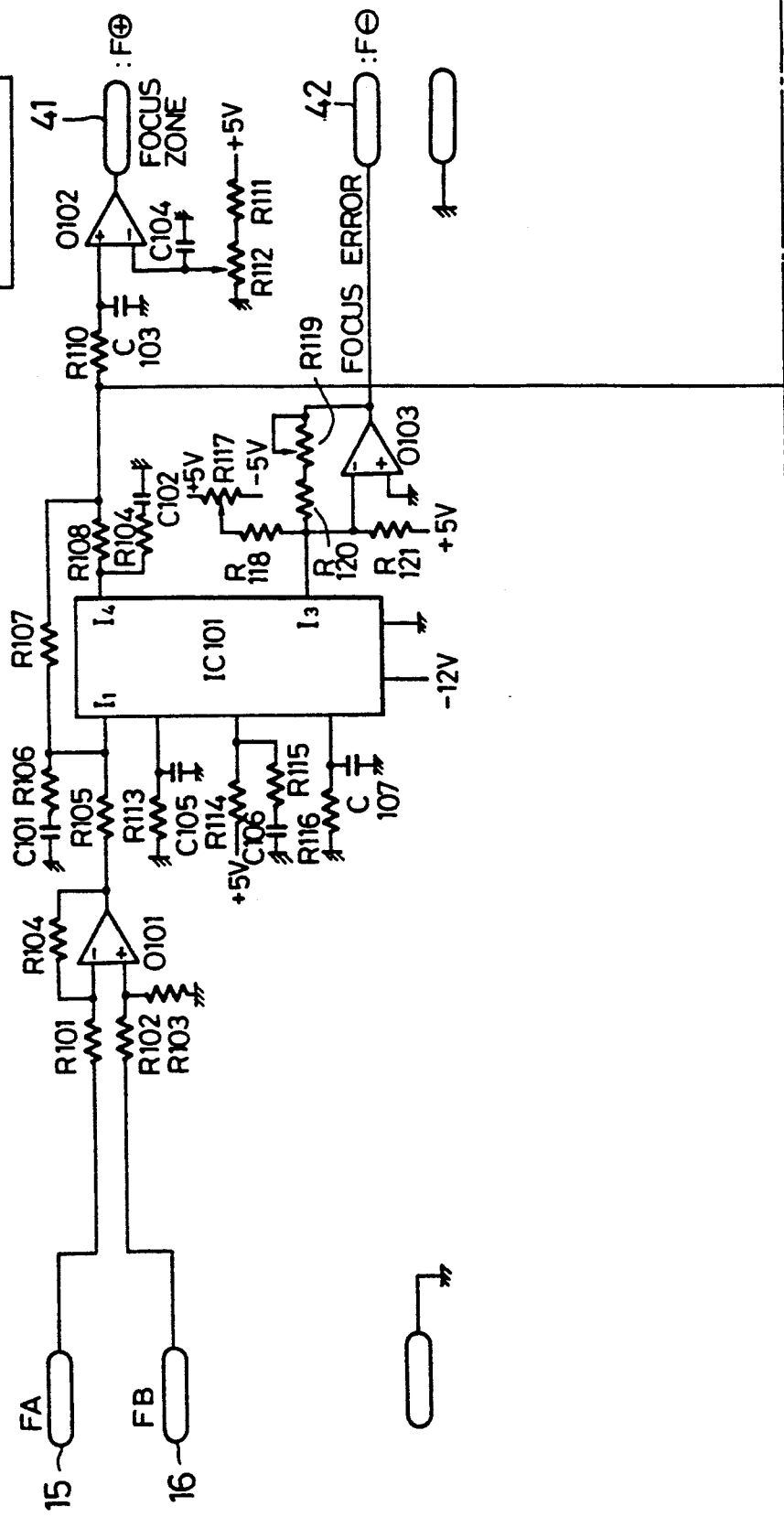

INSIDE

OUTSIDE

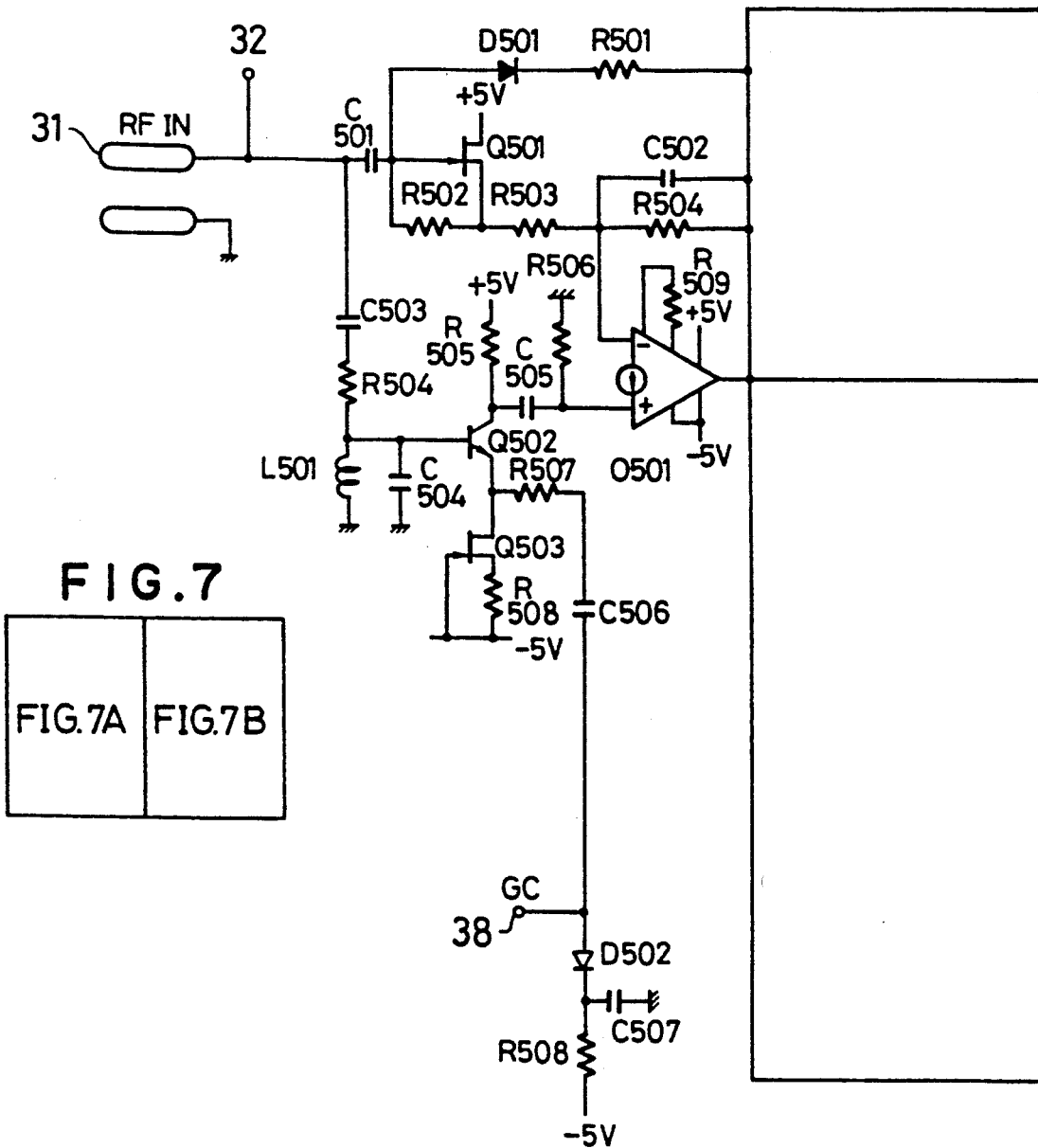

OFF TRACK

OFF TRACK

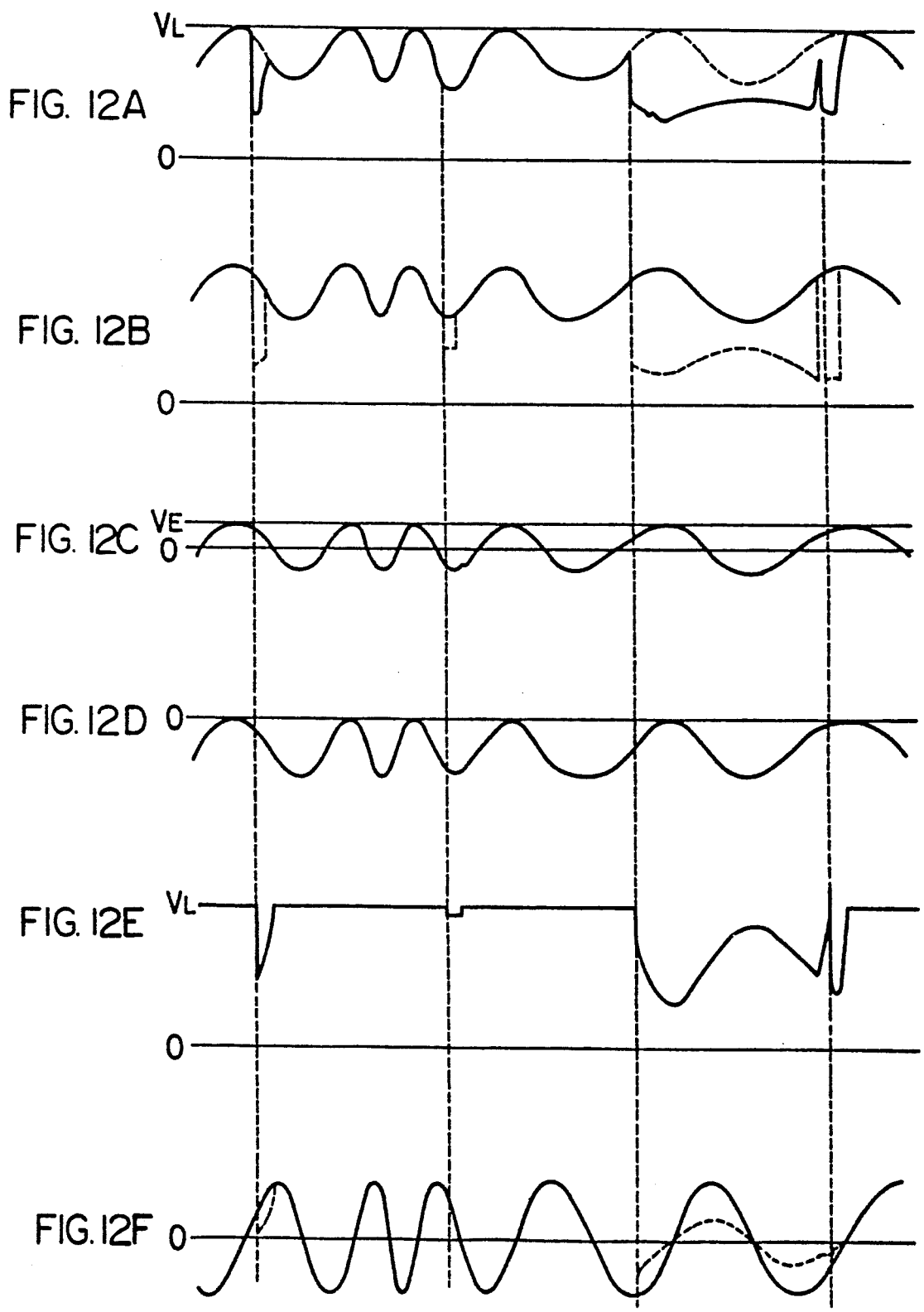

AUTOMATIC GAIN CONTROL APPARATUS

BACKGROUND OF THE INVENTION

This invention relates to an automatic gain control apparatus, including a servo control unit responsive to a servo error signal for locating a movable head with respect to a recording medium.

Optical disks have been employed as a recording medium to store data on tracks thereof. An optical head is used to play back the data recorded on the optical disk. A typical optical head includes a light source, such as a semiconductor laser, for radiating a light (laser) beam through an objective lens onto the optical disk. The objective lens is positioned at a predetermined distance from the optical disk for focusing the light beam on the data recording layer on the optical disk. The optical head also includes photo sensors for sensing the light beam reflected from the optical disk to determine the presence and absence of pits formed in the spiral tracks of the optical disk. The objective lens is supported in such a manner that its optical axis can follow the spiral track and can move from one track to a desired track during a seeking operation, as well as in the direction of the optical axis for focusing.

In order to locate the optical head at an optimum position against the optical disk, the optical head is associated with a focusing servo unit. The focusing servo unit moves the objective lens in a focusing direction parallel to the optical axis thereof so as to maintain the predetermined distance from the optical disk. When the distance of the objective lens from the optical disk deviates from the predetermined distance, the focusing servo unit moves the objective lens to the predetermined distance. The optical head is also associated with a tracking servo unit for moving the objective lens in a tracking direction perpendicular to the track, to locate the light spot on the optical disk at the center of the track when the optical axis deviates from the track center.

A part of the light beam reflected on the optical disk is incident on a photo sensor divided into four independent elements A1, B1, C1 and D1, as shown in FIG. 1A. Another part of the reflected light beam is split into two light beams incident on respective two photo sensor elements E2 and F2, located at positions corresponding to the opposite sides of the track at the same distance from the track center, as shown in FIG. 1B. Each photo sensor element converts the light incident thereon into an electric signal having a level corresponding to the intensity of the incident light beam. The electric signals derived from the photo sensor elements A1 and C1 are added to form an FA signal. The electric signals derived from the photo sensor elements B1 and D1 are added to form an FB signal. The photo sensor element E2 converts the light incident thereon into a TA signal having a level corresponding to the intensity of the incident light. The photo sensor element F2 converts the light incident thereon into a TB signal having a level corresponding to the incident light. The playback signals derived from the photo sensor elements A1 to D1, E2 and F2 are added to form an RF signal. The RF signal is to read data recorded on the optical disk. The TA and TB signals generate a tracking error signal, and the latter is not required to include data components recorded on the optical disk. Therefore the TA and TB signals is limited to a narrow band of frequencies (e.g., below 50 KHz).

Each track comprises a plurality of sectors, each having a pre-format area preceding to a user area on which pits are formed to store data from, for example, a music or image source. The pre-format area has pre-format data previously recorded thereon for use in recording and playing back data on the user area.

FIG. 2A shows a waveform of a pre-format signal included in the RF signal resulting from playback of the pre-format data recorded on the pre-format area under a tracking servo control. The pre-format signal includes a sector mark (SM), a mirror mark (ODF) and VFO and ID signals repeated three times alternatively between the sector mark (SM) and the mirror mark (ODF). The sector mark indicates the start of the pre-format signal. Each VFO signal contains clock pules required to reproduce the succeeding ID signal and has a frequency higher than any other signals recorded on the optical disk. Each ID signal includes at least a sector address and an error detection code. The mirror mark (ODF) is used to adjust the electrical offset of the tracking servo circuit. The mirror mark (ODF) has a level higher than any other signals recorded on the optical disk a signal from a non-recorded area on the track is formed as a pre-groove, and because the ODF is not formed by a pre-groove, the latter leaves a mirror surface of the optical disk.

FIG. 2B shows the RF signal on a reduced time scale. As shown in FIG. 2C, the TA (or TB) signal, which is produced from the photo sensor element E2 (or F2), has a level that is lower when the optical head passes the pre-format area because the pre-format data is recorded on the pre-format area. However, the data recorded on the optical disk can not be played back from the TA (or TB) signal.

FIG. 2D shows the RF signal on a further reduced time scale. It is assumed that the user area of the data sector No. N+1 has recorded data thereon, as indicated by the hatched area in FIG. 2D. As shown in FIG. 2E, the level of the TA (or TB) signal is also lower at the user area of the data sector No. N+1, as well as the pre-format area. It is, therefore, apparent that the level of the tracking error signal produced from the difference (TB-TA) between the TB and TA signals is reduced to a smaller level in the pre-format and user areas having data recorded thereon than in the user areas having no data recorded thereon. Consequently, the tracking servo control is particularly sensitive to disturbances when the optical head passes the recorded areas.

In order to avoid the difficulty, an automatic gain control (AGC) circuit is required to compensate for the level drop of the tracking error signal in the recorded areas. In the previous apparatus, the gain control is performed on an assumption that the level drop of the tracking error signal can be represented merely by the corresponding level drop in the Rf signal. Therefore, it was very difficult to provide accurate compensation for the level drop of the tracking error signal because track cross components are superimposed in the (TA+TB) signal and the tracking error signal (TB-TA), as shown in FIGS. 2F and 2G, respectively, when the optical head traverses the tracks with the tracking servo control being suspended. Such a gain control will render it difficult to ensure a rapid lock-in operation when the tracking servo control is resumed. In addition, the counter, which is used to count the number of peaks of the Rf signals which corresponds to the number of traversed tracks, would accumulate an incorrect count.

SUMMARY OF THE INVENTION

Therefore, it is an object of the present invention to provide an improved automatic gain control apparatus which can perform an accurate servo control that is free from the influence of a track cross component.

There is provided, in accordance with the present invention, an automatic gain control apparatus comprising means for extracting a first signal which is included in a playback signal from a recording medium with tracks and has the highest frequency among signals included in the playback signal, the playback signal includes a track cross component produced when a head traverses the tracks and a recorded area component produced when the head passes an area on which data is recorded;

means for amplifying the first signal extracted by the extraction means;

means for adding the playback signal and the first signal amplified by the amplifying means;

means for holding peak levels of an output of the adding means and producing a compensated playback signal which includes the track cross component but not the recorded area component;

means for producing a first control signal which includes the recorded area component but not the track cross component, from a difference between the playback signal and compensated playback signal; and means for controlling a gain of a tracking error signal in accordance with the first control signal.

According to this invention, a rapid lock-in operation can be performed.

BRIEF DESCRIPTION OF THE DRAWINGS

FIGS. 2A to 2G are waveforms of playback signals produced from the optical head;

FIGS. 3, 3A and 3B are a circuit diagram of a servo error signal generator used in an automatic gain control apparatus of the present invention;

FIGS. 7, 7A and 7B are a circuit diagram of a TCR signal generator used in this invention;

FIGS. 12A to 12F are waveforms used in explaining the operation of the servo error signal generator.

DETAILED DESCRIPTION OF THE PREFERRED EMBODIMENT

Referring to FIG. 3, there is illustrated one embodiment of a servo error signal generator used in an automatic gain control apparatus of the present invention.

The servo error signal generator includes an input terminal 15 to which an FA signal is applied an another input terminal 16 to which an FB signal is applied. Input terminal 15 is coupled through resistor R101 to a negative input of an operational amplifier O101, while a positive input is coupled through resistor R102 to the input terminal 16. The operational amplifier O101 forms a differential amplifier along with resistors R103 and R104. The differential amplifier produces an error signal (FB-FA) at the output of the operational amplifier O101 that is indicative of a difference between the FA and FB signals. The output of the operational amplifier O101 is coupled to a first input I1 and a second input I4 of a first integrated circuit IC101. The integrated circuit IC101 controls the gain of the focusing servo by dividing the value of the signal applied to the first input I1 by the value of the signal applied to the second input I4 and outputting a signal indicative of the result of the division at output I3. Output I3 of the integrated circuit IC101 is coupled to the negative input of an operational amplifier O103 that has a grounded positive input. The operational amplifier O103 forms an amplifier in conjunction with resistors R119, R120 and R121. A focusing error signal produced at the output of the operational amplifier O103 is supplied to an output terminal 42 for connection to a focusing servo control circuit (not shown).

Figure 1A:
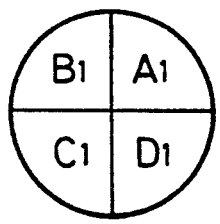
FIGS. 1A and 1B are schematic diagrams showing photo sensor elements used in an optical head.
Figure 1B:
Figure 3B:
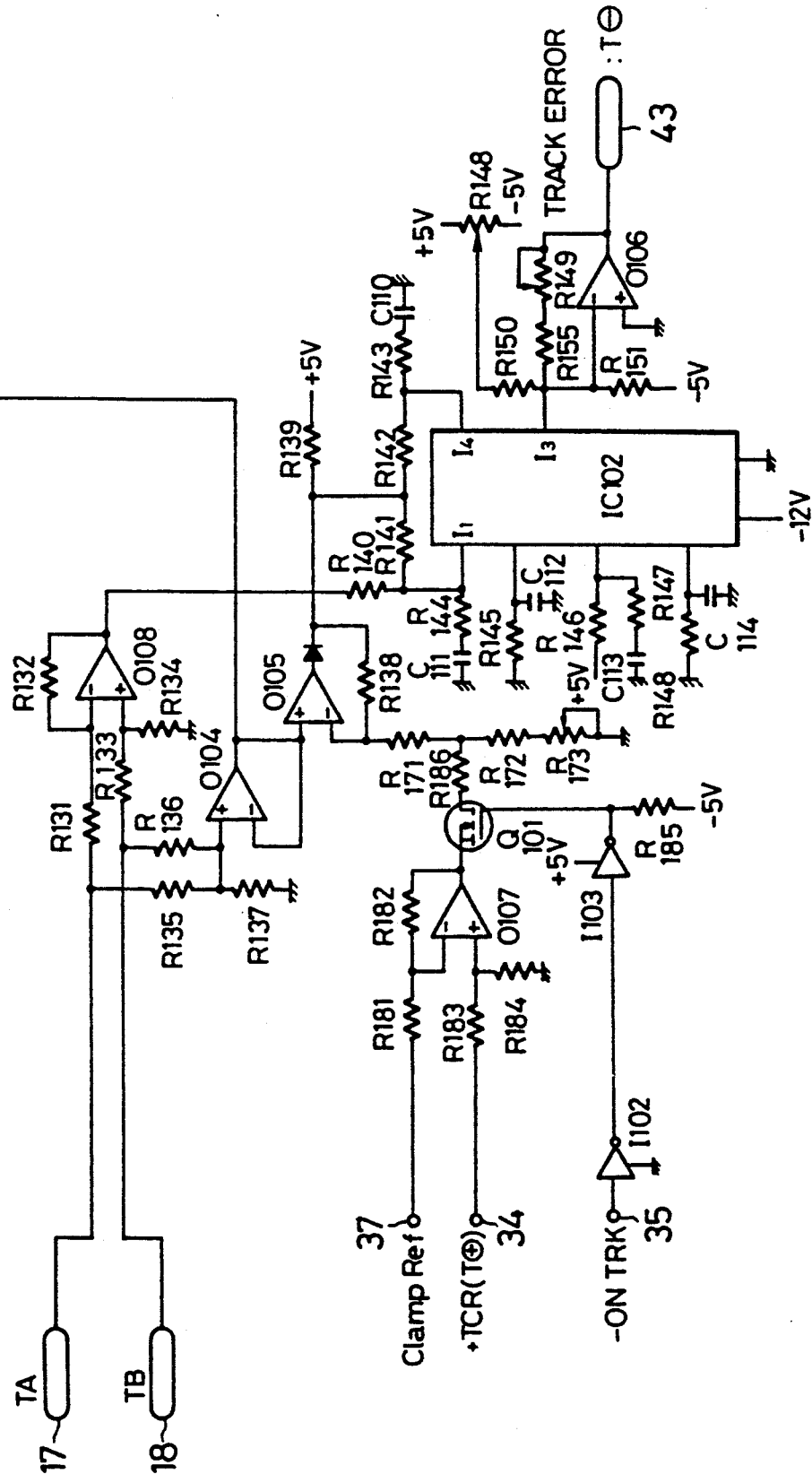

Referring to FIG. 3B, the servo error signal generator also includes an input terminal 17 to which the TA signal is applied and another input terminal 18 to which the TB signal is applied. The input terminal 17 is coupled through resistor R131 to a negative input of an operational amplifier O108, while a positive input of the operational amplifier Q108 is coupled through resistor R133 to the input terminal 18. The operational amplifier O108 forms a differential amplifier along with resistors R132 and R134. The differential amplifier produces an error signal (TB−TA) that is indicative of a difference between the TA and TB signals from the output of operational amplifier O108. The output of operational amplifier O108 is coupled through resistor R140 to a first input I1 and a second input I4 of a second integrated circuit IC102. The second integrated circuit IC102 controls the gain of the tracking servo by dividing the value of the signal applied to the first input I1 by the value of the signal applied to the second input I4 and producing an output signal at output I3. Output I3 of the second integrated circuit IC102 is coupled to a negative input of operational amplifier O106 that has a grounded positive input. The operational amplifier O106 forms an amplifier, along with resistors R149, R155 and R151. A tracking error signal produced at the output of the operational amplifier O106 is coupled to an output terminal 43 for connection to a tracking servo control circuit (not shown).

Figure 4A:
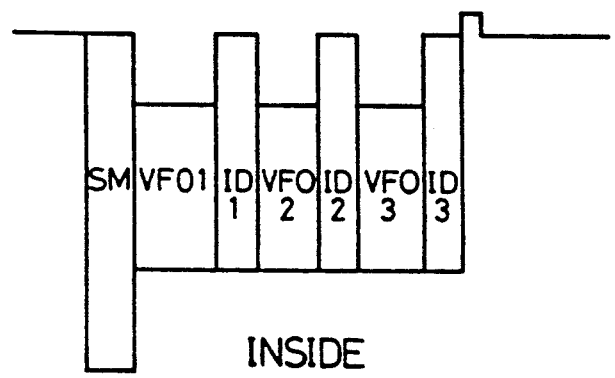
FIGS. 4A and 4B are diagrams used in explaining playback signal level drops.
Figure 4B:
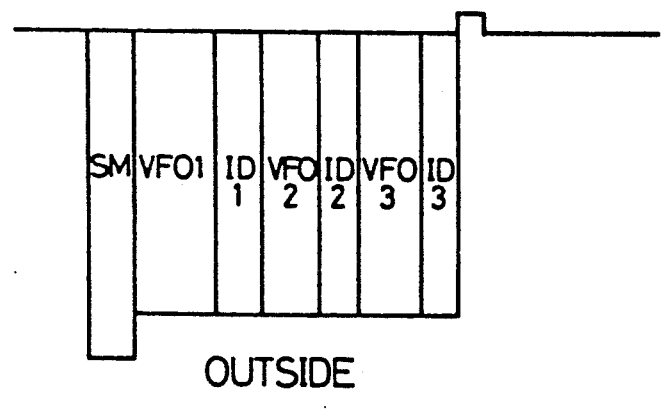

Since the optical disk is usually a constant angular velocity type (CAV) disk, the length of pits formed in recording a signal on an optical disk decreases as the pits are formed closer to the center of the optical disk and also as the signal has a higher frequency. FIG. 4A shows the waveforms of an RF signal played back from an inner track, whereas FIG. 4B shows the waveforms of the RF signal played back from an outer track. As can be seen from a comparison of FIGS. 4A and 4B, the levels of a VFO signal played back from the inner track are lower than that of the VFO signals played back from the outer track because each VFO signal has a high frequency.

Figure 5:
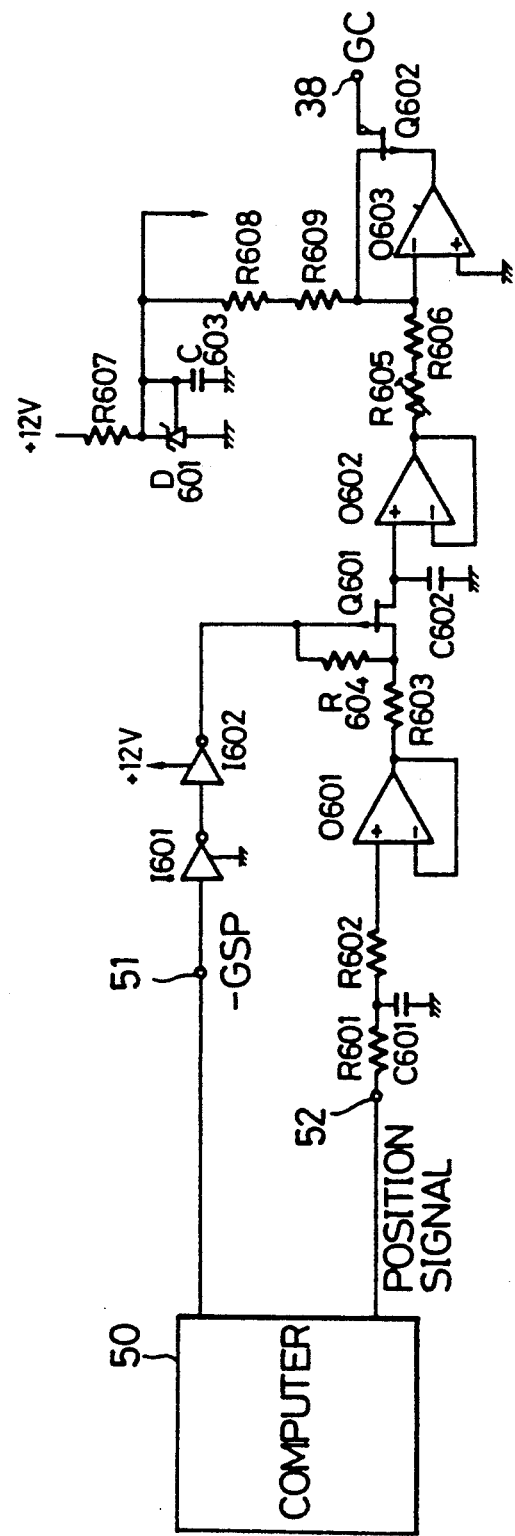
FIG. 5 is a circuit diagram of a gain control signal generator used in this invention.
Figure 6A:
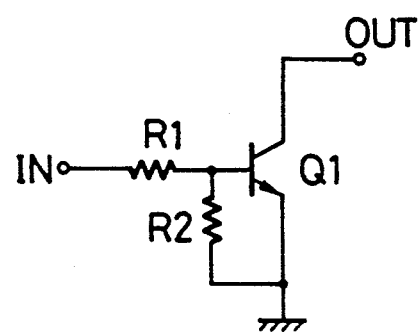
FIGS. 6A and 6B are circuit diagrams of inverters used in this invention.
Figure 6B:
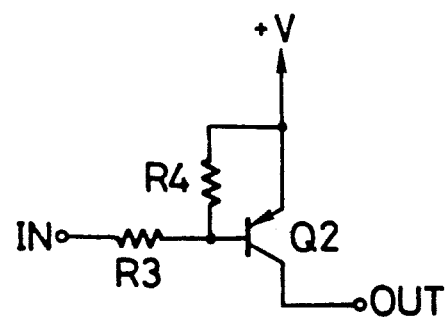

Referring to FIG. 5, there is illustrated a gain control (GC) signa generator used in the apparatus of the present invention for compensating for a VFO signal level drop. The gain control signal generator includes a first input terminal 51 to which a -GSP signal is applied from a computer 50 and a second input terminal 52 to which a track position signal is applied from the computer 50. The level of the -GSP signal is inverted to a logic level L, for example, each time the optical head crosses a predetermined number of tracks. Input terminal 51 is coupled through two inverters I601 and I602 to a gate of a field effect transistor (FET) Q601. Referring to FIGS. 6A and 6B, inverter I601 comprises a NPN transistor Q1, a base of which is connected with an input terminal through a resistor R1 and with a grounded emitter thereof through a resistor R2 and a collector which is connected to an output terminal. Therefore, inverter I601 outputs a logic level L when a logic level H is inputted and the output thereof is open when a logic level L is inputted. Inverter I602 comprises a PNP transistor Q2, a base of which is connected with an input terminal through a resistor R3, a emitter of which is connected to a specific voltage and with a base thereof through a resistor R4 and a collector of which is connected to an output terminal. Therefore, the inverter I602 outputs a logic level H when a logic level L is inputted and the output is open when a logic level H is inputted.

The track position signal is indicative of the distance at which the optic head is located in a radial direction of the optical disk. The input terminal 52 is coupled to resistor R601 and capacitor C601, which forms an integrator. The output of the integrator is coupled through resistor R602 to a positive input of an operational amplifier O601 that functions as a buffer amplifier. The output of the operational amplifier O601 is coupled through resistor R603 to a drain of FET Q601, while a source of the FET O601 is grounded through capacitor C602. The FET Q601 is turned on to charge capacitor C602 with the output of the operational amplifier O601 when the -GSP signal has a LOW level. The FET Q601 is turned OFF to disconnect the capacitor C602 from the output of the operational amplifier O601 when the -GSP signal has a HIGH level. The source of FET Q601 is coupled to an output terminal 38 through an amplifier which comprises including operational amplifiers O602 and O603 and an FET Q602 to produce a gain control (GC) signal at the output terminal 38. Thus, the gain control (GC) signal has a signal level that is in compliance with a position on the optical head in the radial direction of the optical disk.

Referring to FIG. 7A, a played back RF signal is applied to an input terminal 31 and is divided into two signal paths. The first signal path includes a capacitor C501, an FET Q501, resistors R502 and R503 and is connected to a negative input of an operational amplifier O501. The second signal path includes a capacitor C503 and a band pass filter, including a resistor R504, inductance L501 and capacitor C504. This band pass filter has a center frequency equal to the frequency of the VFO signal to extract the VFO signal from the RF signal. The output of the band pass filter is coupled to the base of transistor Q502, having an emitter connected to a source of FET Q503 which has a drain connected through resistor R508 to a specific voltage and a gate connected to the specific voltage. The transistor Q502 forms a negative amplifier for inverting and amplifying the extracted VFO signal at an amplification degree determined by a current flow through the emitter of transistor Q502. The inverted and amplified VFO signal appears on the collector of transistor Q502 and is applied through capacitor C505 to a positive input of the operational amplifier O501.

Figure 8A:
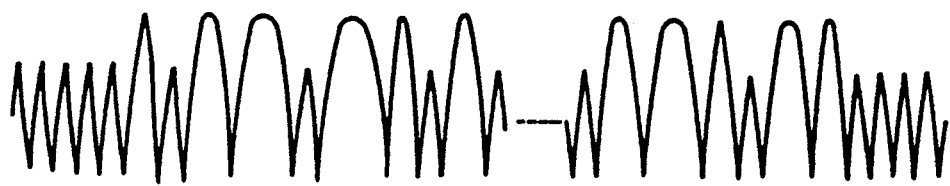
FIGS. 8A to 8C are waveforms obtained in the TCR signal generator.
Figure 8B:
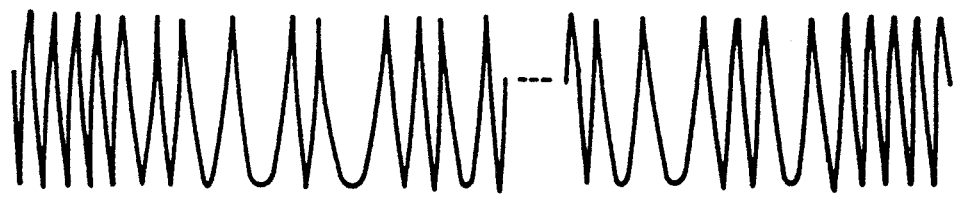

The emitter of transistor Q502 is also connected through capacitor C506 to terminal 38 to which the gain control (GC) signal is applied from the circuit shown in FIG. 5. Terminal 38 is also connected to an anode of a PIN diode D502, having a cathode grounded through capacitor C507 and also to a specific voltage through a resistor that is R508. The PIN diode D502 has a variable resistance dependent on the level of the gain control (GC) signal supplied from terminal 38. Therefore, the level of the gain control (GC) signal has a direct effect on the impedance of the circuit connected to the emitter of transistor Q502, and thus on the amplification degree of the transistor Q502. The amplification degree of the transistor Q502 increases as the optical head is positioned closer to the center of the optical disk. The operational amplifier O501 forms a negative differential amplifier for producing a differential signal at the output thereof. The differential signal is indicative of the difference between the RF signal inputted from terminal 31, as shown in FIG. 8A, and the VFO signal amplified at an amplification degree determined by the gain contro (GC) signal to compensate for the VFO signal level drop related to the radial position of the optical head. FIG. 8B shows the waveform of the compensated signal produced at the output of the operational amplifier O501 in an inverted form in comparison with the RF signal. The differential signal is applied from the output of operational amplifier O501 to an output terminal 33 for connection to a reading circuit (not shown), where the played back pre-format signal is read.

Figure 9A:
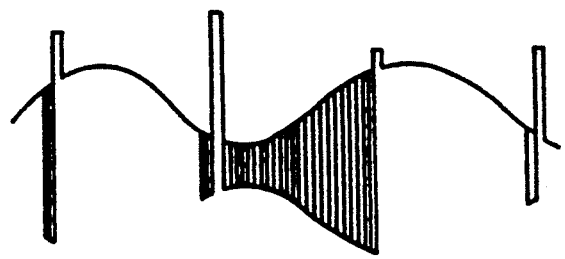
FIGS. 9A to 9C are waveforms obtained in the TCR signal generator when the tracking servo control is OFF.
Figure 9B:
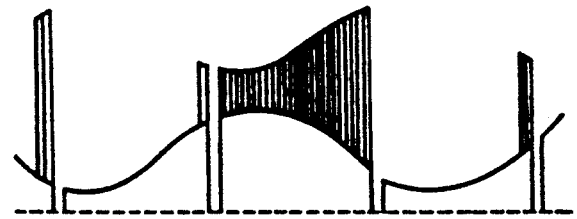

Capacitor C501 is connected through a series connection of a diode D501 and resistor R501 to the output of operational amplifier O501. Since the RF signal shown in FIG. 8A is applied to the negative input of the operational amplifier O501, the RF signal is inverted by it. The diode D501 is forward biased to charge the capacitor C501 with the played back RF signal fed thereto from the input terminal 31 only when a mirror mark (ODF), having the highest level, is played back. When no mirror mark (ODF) is played back, the diode D501 is reverse biased. In this case, capacitor C501 is discharged through a line including resistors R502, R503 and R504 which is connected to the output of operational amplifier O501. Thus, the operational amplifier O501 produces an output signal wherein the level of each mirror mark (ODF) is clamped at a predetermined potential, as shown in FIG. 9B. This is effective to maintain the played back RF signal in a predetermined range in spite of any mirror mark level variations caused by variations in the reflection factor of the mirror surface portion of the optical disk.

Figure 9C:
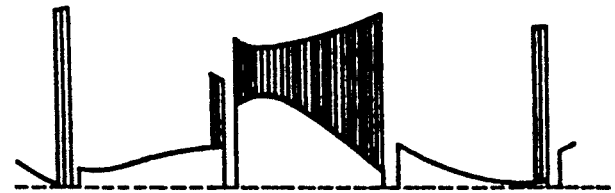

The time constant, which determined the discharging time of the capacitor C501, is set at a desired value to prevent distortions of the output of the operational amplifier O501, as shown in FIG. 9C, and to maintain the reflection factor variations in the respective sectors within a permissible range. Resistor R501 is effective to keep the waveform of the output of operational amplifier O501 free from distortion during the charging duration of the capacitor C501. Although the distortion avoiding effect is greater with resistor R501 having a greater resistance, the response speed will be slower since the time constant increases. For this reason, the resistance of resistor R501 is set at an appropriate value.

Figure 7B:
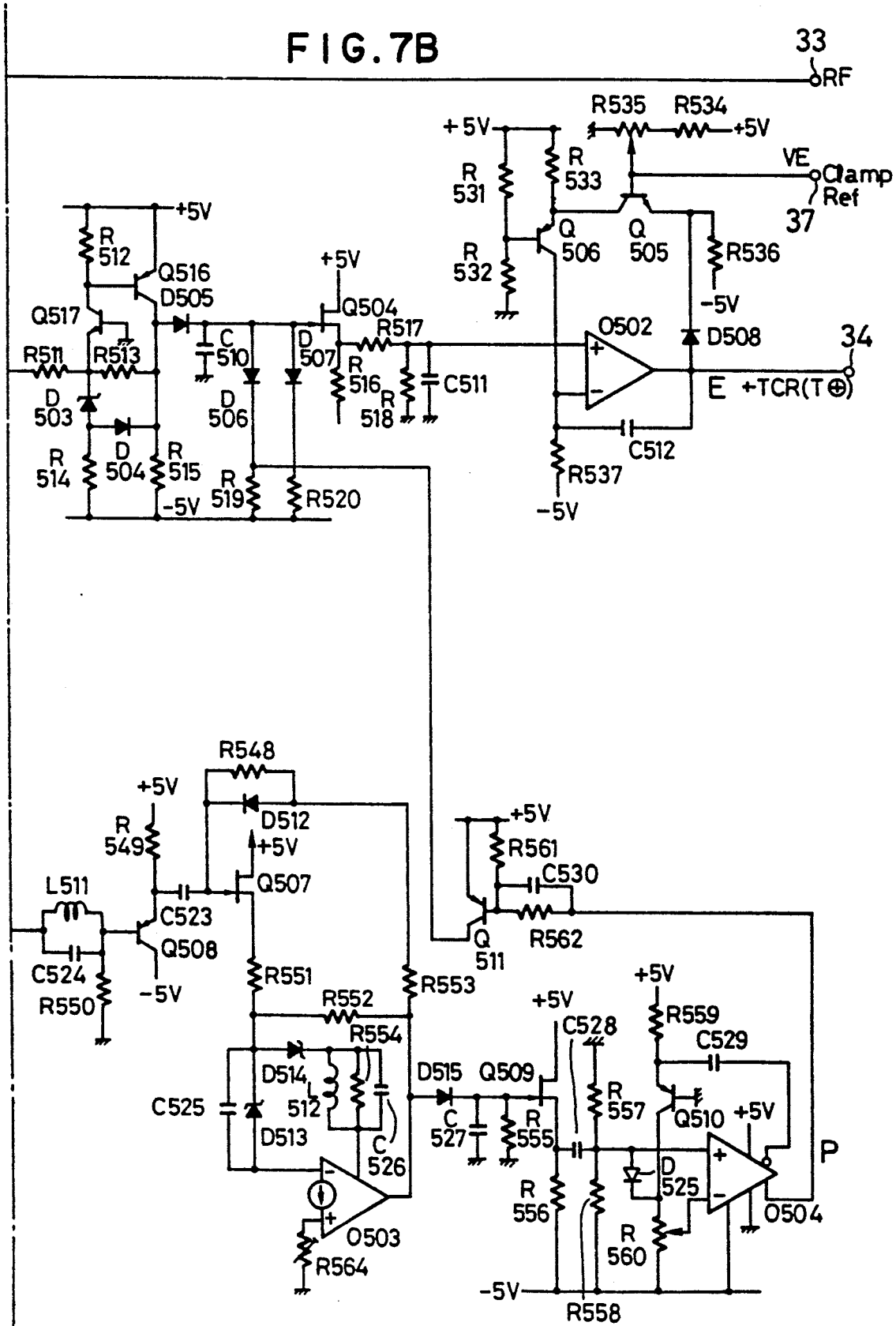
Figure 10A:
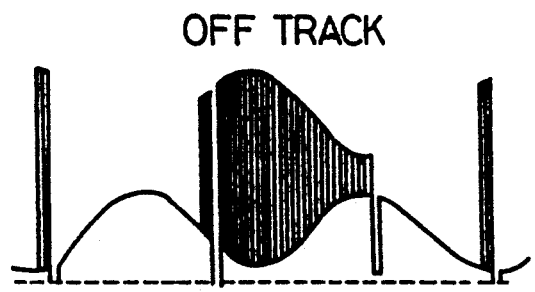
FIGS. 10A to 10F are waveforms obtained in the TCR signal generator.
Figure 10B:
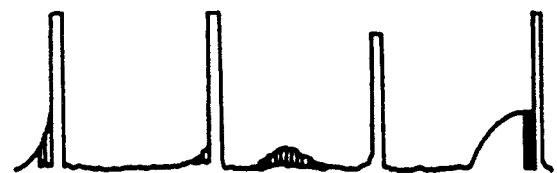
Figure 10C:
Figure 10D:
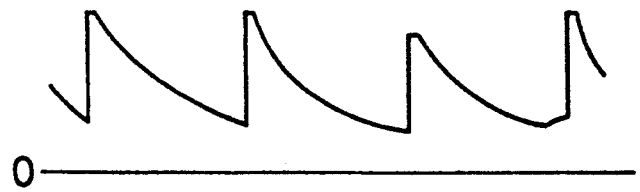
Figure 10E:
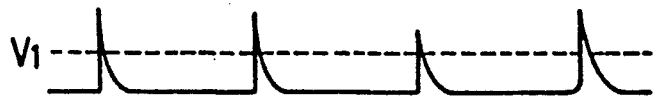
Figure 10F:

Referring to FIG. 7B, the output of operational amplifier O501 is also coupled to a band elimination filter having an inductance L511, a capacitor C524 and a resistor R550. This band elimination filter has a center frequency substantially equal to that of the VFO signal included in the RF signal for removing the VFO signal from the RF signal fed thereto from the operational amplifier O501. This is effective to avoid an incorrect mirror mark detection taking the VFO signal for the mirror mark (ODF). The output of the band elimination filter is coupled to base of a transistor Q508, having an emitter connected through resistor R549 to a specific voltage and a collector connected to another specific voltage. The emitter of transistor Q508 is also connected through capacitor C523 to a gate of FET Q507. FET Q507 has a source coupled to a specific voltage and a drain connected through resistor R551 to an amplifier comprising an operational amplifier O503. The amplifier has an amplification degree that is variable by variations of a variable resistor R564 for amplifying the mirror mark (ODF) and saturating the other components, as shown in FIG. 10B. The output signal of operational amplifier O503 is supplied through diode D515 to capacitor C527. Diode D515 is forward biased to charge capacitor C527 when the voltage at the output of operational amplifier O503 exceeds the voltage across capacitor C527. Since the mirror mark (ODF) has a level that is higher than the other components of the played back RF signal, diode D515 is reverse biased so that capacitor C527 is discharged through resistor R555 when no mirror mark is played back. Therefore, the voltage across capacitor C527 has a high level when a mirror mark is played back and it decreases gradually through the resistor R555 to be a sawtooth voltage, as shown in FIG. 10D. The voltage across capacitor C527 is applied via FET Q509 to a differentiating circuit that comprises a capacitor C528 and resistors R557 and R558. FIG. 10E shows a waveform of a signal produced at the output of the differentiating circuit. The output of the differentiating circuit is coupled to a positive input of operational amplifier O504, which has a reference voltage V1, set by a variable resistor R560, connected to a negative input. Operational amplifier O504 forms a comparator along with transistor Q510, resistor R559, diode D525 and capacitor C529. This comparator compares the differentiated signal with a reference value V1 to produce a pulse having a predetermined pulse width, as shown in FIG. 10F, each time a mirror mark is played back. The pulse width is determined by capacitor C529 and resistor R559. Capacitor C527, which forms a peak hold circuit, serves to eliminate noises, as shown in FIG. 10C, which may be superimposed on the differentiated signal if there was not provided the capacitor C527.

Figure 8C:
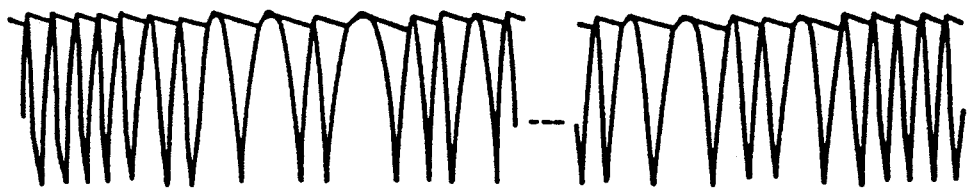

The RF signal, shown in FIG. 8A, which is inputted from the input terminal 31 is inverted and amplified by operational amplifier O501, as shown in FIG. 8B. Furthermore, the output signal of operational amplifier O501 is inverted and amplified by an amplifier that includes transistors Q516 and Q517, and applied to a peak hold circuit comprising capacitor C510, resistors R519 and R520, and diodes D505, D506 and D507. When the voltage at the output of transistor Q516 exceeds the voltage across the capacitor C510, the diode D505 is forward biased to charge the capacitor C510 with the output of transistor Q516. When the voltage across capacitor C510 exceeds the voltage at the output of transistor Q516, diode D505 is reverse biased to block the transmission of the signal to the capacitor C510. At this time, diode D506 remains turned OFF and the capacitor C501 is discharged through the series circuit of diode D507 and resistor R520 for the next peak hold cycle. Thus, the peak of the signal outputted from the transistor Q516 is held by the capacitor C510 as shown in FIG. 8C and the charged voltage of the capacitor C510 is applied to a gate of an FET Q504.

FET Q504 amplifies the signal inputted to its gate and outputs the amplified signal to a low pass filter that includes resistors R517 and R518 and a capacitor C511. This low pass filter is effective to filter out the high-frequency noises which may be superimposed on the peak envelope signal during the peak hold operation and also to limit the frequency band (about 10 MHz) of the RF signal to a servo band (for example, 50 KHz). The output of the low pass filter is coupled to a positive terminal of an operational amplifier O502. The operational amplifier O502 forms a clamping circuit along with capacitor 512, diode D508 and transistors Q505 and Q506 for clamping the input signal to a reference voltage VE, determined by a variable resistor R535. The reference voltage (clamp level) VE is applied to an output terminal 37 and also to the base of transistor Q505.

FIG. 12B shows an waveform of the input signal applied to the positive input of the operational amplifier O502 in FIG. 7. As is apparent from the waveform, the level drops of the signal are compensated. FIG. 12C shows the waveform of the output signal produced at the output of the operational amplifier O502. When the input signal increases, and thus, the output signal increases, the voltage at the emitter of the transistor Q505 increases. As a result, the current flow from resistor R533 to transistor Q505 decreases and the current flow from resistor R533 to transistor Q506 increases. Consequently, the voltage applied to the negative input of the operational amplifier O502 increases to decrease the voltage at the output of operational amplifier O502. The voltage VE applied to the base of the transistor Q505 is higher by a voltage Vbe than the voltage at the emitter thereof. The voltage at the output of the operational amplifier O502 is higher by the forward voltage of the diode D508 than the voltage at the emitter of the transistor Q505. Since the voltage Vbe is substantially equal to the forward voltage of diode D508, operational amplifier O502 produces an output signal having peaks clamped to the voltage VE which is set at the base of the transistor Q505, as shown in FIG. 12C. The voltage, which appears at the output of the operational amplifier O502, is applied as a +TCR signal to output terminal 34. It is to be noted that the +TCR signal has a level that is compensated for its level drop which is caused when the optical head passes one of the recorded areas of the optical disk, as shown in FIG. 12C. The +TCR signal is applied to terminal 34 in FIG. 3.

The junction of diode D506 and resistor R519 is connected to a collector of a transistor Q511, the emitter of which is connected to a specific voltage and the base of which is connected to the output of operational amplifier O504. When operational amplifier Q504 produces a HIGH level pulse, shown in FIG. 10F, occurrence of a mirror mark, transistor Q511 is turned OFF, which turns ON diode D506, which has been reverse biased. As a result, capacitor C510 is discharged at a high rate through the series circuit of diode D506 and resistor R519 when a mirror mark is detected. This is effective to inhibit capacitor C510 from being charged with the voltage resulting from the mirror mark.

It is to be noted that the peak hold circuit may be arranged as a bottom hold circuit.

Figures 11A, 11B, 11C, 11D:
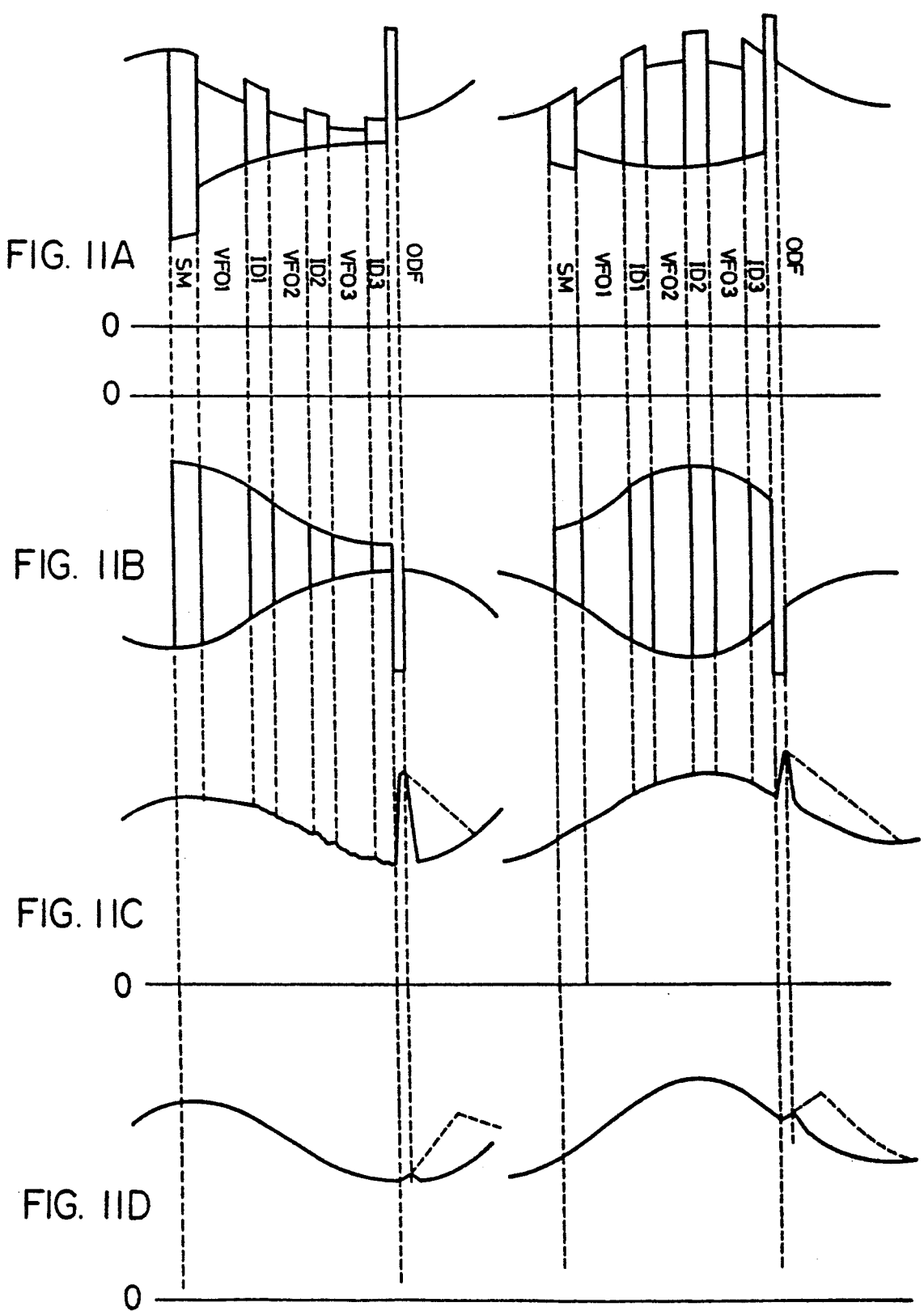
FIGS. 11A to 11D are waveforms obtained in the TCR signal generator.

FIGS. 11A to 11D show the waveforms of various signals on a reduced time scale. FIG. 11A shows the waveform of the RF signal inputted to input terminal 31 when the focusing servo control is ON and the tracking servo control is OFF. The RF signal includes track cross signals, produced when the optical head traverses tracks, and the VFO signals. FIG. 11B shows the waveform of the RF signal which is outputted from the operational amplifier O501 and includes the compensated VFO signals. The waveform of the signal produced at the output of the peak hold circuit C510 is as shown in FIG. 11C and the waveform of the signal produced at the low pass filter, including capacitor C511, is an upper envelope of the output signal of the peak hold circuit C510, as shown in FIG. 11D.

If there was no means for preventing capacitor C510 from being charged with the voltage resulting from the mirror mark (ODF), the waveforms of the output signals of capacitors C510 and C511 will be as shown by the broken line in FIGS. 11C and 11D, respectively. Namely, the signal outputted from capacitor C511 includes the components of mirror marks which are not included in a signal (TA+TB) which has a relatively narrow frequency band (at most 50 KHz). As described below, in this invention, a control signal, indicative of level drops in compliance with the recorded areas, is produced from the signal (TA+TB) and a signal in which the level drops of the VFO signals are compensated. Accordingly, if the charging of capacitor C510 by the mirror mark was not prevented, the mirror mark components are included in the control signal. This is prevented in this invention because the time constant in the peak hold circuit is extremely reduced at the time of occurrence of the mirror marks.

Returning to FIG. 3, terminal 17, to which the TA signal is applied, is coupled through resistor R135 to a positive terminal of an operational amplifier O104. Terminal 18, to which the TB signal is applied, is coupled through resistor R136 to the positive input of the operational amplifier O104. The operational amplifier O104 serves as an adder for producing a signal (TA+TB) which is indicative of the sum of the TA and TB signals. It is to be noted that the signal (TA+TB) includes track cross signals produced when the optical head traverses the tracks and level drops produced when the optical head passes one of the recorded areas having data recorded thereon. This signal (TA+TB) is applied through resistor R110 to the positive terminal of operational amplifier O102, having a negative input coupled to a reference voltage source that includes resistors R111 and R112. The operational amplifier O102 serves as a comparator to compare the added signal (TA+TB) with a reference voltage to produce a Focus Zone (F+) signal indicative of a focusing zone. The output of the operational amplifier O102 is coupled to an output terminal 41.

Signal (TA+TB) is also applied from the output of the operational amplifier O104 through resistor R108 to the second input I4 of the first integrated circuit IC101. The first integrated circuit IC101 divides the error signal FB-FA applied to the first input I1 thereof by the signal (TA+TB) to produce an output signal that is indicative of the resulting quotient (FB−FA)/(TA+TB). Output terminal I3 of the first integrated circuit IC101 is coupled to an amplifier including an operational amplifier O103 for amplifying the signal fed thereto from the first integrated circuit IC101 to produce a focusing error signal F. The focusing error signal is applied to output terminal 42 for connection to the focusing servo control circuit.

Terminal 37, to which the Clamp Ref signal produced by the resistors R535 and R534 shown in FIG. 7 is applied through a resistor R181 to a negative terminal of an operational amplifier O107, have a positive input coupled through resistor R183 to terminal 34, to which the +TCR signal produced from the operational amplifier O502, shown in FIG. 7 is applied. The operational amplifier O107 serves as a differential amplifier for producing a differential signal (+TCR−VE) indicative of a difference of the Clamp Ref signal VE from the +TCR signal. It is to be noted that the differential signal (+TCR−VE) includes the track cross signals produced when the optical head traverses the tracks but not the level drop in compliance with the recorded area. The output of the operational amplifier O107 is coupled to a drain of an FET Q101 having a source coupled through resistors R186 and R171 to a negative terminal of an operational amplifier O105. The gate of the FET Q101 is coupled through inverters I102 and I103 to terminal 35, to which an -ON TRK signal is applied from the computer 50.

Inverters I102 and I103 have structures as shown in FIGS. 6A and 6B, respectively. Inverter I102 produces a low level output in response to a HIGH level input and the output thereof is OPEN in responsive to a LOW level input. Inverter I103 produces a HIGH level output in response to a LOW level input and the output thereof is OPEN in responsive to a HIGH level input.

The −ON TRK signal has a LOW level when the tracking servo control is ON and a HIGH level when the tracking servo control is OFF. When the tracking servo control is OFF, FET Q101 is turned ON to couple the output of the operational amplifier 0107 to the negative input of the operational amplifier 0105 having a positive input coupled to the output of the operational amplifier 0104. The operational amplifier 0105 serves as a differential amplifier for producing a differential signal indicative of a difference {(TA+TB)−(+TCR−VE)} of the signal (+TCR−VE) from the signal (TA+TB). Since the signal (TA+TB) includes the track cross signals produced when the optical head traverses the track and the level drops produced when the playback is performed in the recorded areas having data recorded thereon, whereas the signal (+TCR−VE) includes only the track cross signals, the differential signal {(TA+TB)−(+TCR−VE)} produced at the output of the operational amplifier 0105 includes only the level drop components. The output of the operational amplifier 0105 is coupled through resistor R142 to the second input I4 of the second integrated circuit IC102. The second integrated circuit IC102 divides the error signal (TB−TA) applied to the first input I1 thereof from the operational amplifier 0108 by the differential signal {(TA+TB)−(+TCR−VE)} applied to the second input I4 thereof from the operational amplifier 0105 to produce an output signal that is indicative of the resulting quotient {(TB−TA)/((TA+TB)−(TCR−VE))}. The signal is outputted from output terminal I3 of the second integrated circuit IC102 to a negative input of an operational amplifier 0106 that forms a negative amplifier along with resistors R149, R151 and R155, and the output signal of the negative amplifier is supplied as a tracking error signal T− to output terminal 43 for connection to the tracking servo control circuit.

The operation of the gain control apparatus of this invention will be described further with reference to FIGS. 12A to 12F. When the optical head is moving at a high rate in the radial direction of the optical disk with the focusing servo control being ON and with the tracking servo control being OFF, the reproduced RF signal has a level that is increased (track cross component) each time the optical head traverses a track and a level that is decreased each time the optical head passes one of the recorded areas including pre-format areas having pre-format data recorded thereon. FIG. 12A shows the waveform of the signal (TA+TB) produced at the output of the operational amplifier 0104. The signal (TA+TB) includes no playback data but the level drop component in compliance with the recorded areas, because the amplifier including the operational amplifier 0104 has a narrow frequency band as described previously.

The differential amplifier including the operational amplifier 0107 subtracts the Clamp Ref signal (DC component VE) from the +TCR signal to produce an output signal (TCR−VE), as shown in FIG. 12D. This output signal contains only the track cross components. On the other hand, the signal (TA+TB) outputted from operational amplifier 0104 contains the track cross components and the level drop components in compliance with the recorded areas, as shown in FIG. 12A. The differential amplifier including the operational amplifier 0105 subtracts the signal (TCR−VE) from the signal (TA+TB) to produce a control signal {(TA+TB)−(+TCR−VE)} which includes only the DC components produced when the optical head passes the recorded areas, as shown in FIG. 12E. Although the reference voltage VE is used to set the DC bias for the +TCR signal at a predetermined value, it is to be noted that the reference voltage VE may be set at zero. In this case, the operational amplifier 0107 is removed and terminal 34 is directly coupled to the drain of FET Q101.

The control signal {(TA−TB)−(TCR−VE)} is applied to the second input terminal I4 of the second integrated circuit IC102 which receives the error signal (TB−TA) at the first input I1 thereof. The waveform of the error signal (TB−TA) is indicated by the broken curve in FIG. 12F. The second integrated circuit IC102 divides the error signal (TB−TA) by the control signal {(TA+TB)−(+TCR−VE)} to produce an output signal indicative of the resulting quotient at its output 13. This output signal increases as the control signal fed from the output of operational amplifier 0105 decrease and vice versa. The output signal is applied to the amplifier including the operational amplifier 0106 and amplified by it to produce a tracking error signal T−. The tracking error signal T−, indicated by the solid curve in FIG. 12F, is applied to the output terminal 43 for connection to the tracking servo control circuit (not shown).

This operation is performed not only when the optical head is moving at a high rate from one track to another during a seek or jump mode, but also when the optical head traverses one or more tracks before the tracking servo control is ON.

When the tracking servo control is resumed for a normal recording/playback operation, the −ON TRK signal applied to terminal 35 in FIG. 3 is changed to its LOW level. As a result, the FET Q101 is turned OFF to block the transmission of the differential signal (+TCR−VE) to the negative input of the differential amplifier 0105. Consequently, operational amplifier 0105 produces a control signal corresponding to the signal (TA+TB) applied thereto from operational amplifier 0104. Since the tracking servo control is ON, the signal (TA+TB) includes no track cross component but the level drop in compliance with the recorded areas. Therefore, the control signal (TA+TB) is applied from the operational amplifier 0105 to the second input I4 of the second integrated circuit IC102 in the same way as in the case described above.

Although in the embodiment described above, the control signal produced from the output of the differential amplifier including the operational amplifier 0105 is used only to compensate the tracking error signal, it is to be noted, of course, that the control signal may also be used to compensate the focusing error signal. In this case, the output of the differential amplifier including the operational amplifier 0105 is connected through resistor R108 to the second input I4 of the first integrated circuit IC101, instead of the connection of the output of the operational amplifier 0104.

What is claimed is:

1. An automatic gain control apparatus employed with a recording medium playback system, comprising:
   means for extracting a first signal which is included in a playback signal from a recording medium having a plurality of tracks and which has a frequency signal that is higher than other frequency signals included in said playback signal, said playback signal including a track cross component that is produced when a head associated with said recording medium playback system traverses a track on which data is recorded;
   means for amplifying said first signal extracted by said extracting means;
   means for adding said playback signal and said first signal amplified by said amplifying means to generate a compensated playback signal;
   means for holding peak levels of said compensated playback signal to generate a first base signal that includes only said track cross component;
   means for generating a second base signal that corresponds to a position of said head with respect to a track of said recording medium, said second base signal including both said track cross component and a recorded area component;
   means for generating a first control signal which includes only said recorded area component, based upon said first base signal and said second base signal; and
   means for controlling a gain of an error signal in accordance with said first control signal.

2. An automatic gain control apparatus according to claim 1,
   wherein said controlling means comprises a means for dividing said error signal by said first control signal.

3. An automatic gain control apparatus according to claim 1,
   wherein said recording medium comprises a disk and said apparatus further comprises means for producing a second control signal which has a level corresponding to said head position in radial direction of said disk and by which an amplification degree of said amplifying means is determined.

4. The automatic gain control apparatus of claim 1, wherein said automatic gain control apparatus further comprises a low-pass filter means for passing through a low frequency componenet of said signal held by said peak level holding means and transmits said low frequency component to said gain controlling means.

5. An automatic gain control apparatus according to claim 4, wherein said apparatus further comprises means for clamping an output of said low-pass filter means at a predetermined level.

6. An automatic gain control apparatus according to claim 1, wherein said recording medium comprises an optical disk having said track, each including a plurality of sectors, each sector having a pre-format area preceding a user area, said pre-format area having pre-format data recorded thereon, wherein said playback signal includes a pre-format signal in compliance with said pre-format data, said, pre-format signal including a sector mark, a mirror mark and VFO and ID signals which are repeated a predetermined number of time between said sector mark and said mirror mark, said mirror mark having a level that is higher that any other signals included in said pre-format signal, said VFO signals each having a frequency higher that any other signals included in said pre-format signal for use in playing back respective ID signals succeeded thereto.

7. An automatic gain control apparatus according to claim 6, wherein said VFO signal comprises said first signal.

8. An automatic gain control apparatus according to claim 6, wherein said apparatus further comprises:
means responsive to said mirror mark included in said playback signal for producing a mirror mark detection signal; and
means responsive to said mirror mark detection signal for controlling the operation of said peak level holding means so that the holding of said peak level of said playback signal in compliance with said mirror mark is substantially inhibited.

9. An automatic gain control apparatus according to claim 8,
wherein said means responsive to said mirror mark further comprises:
means for eliminating said VFO signal from an output of said adding means;
second means for amplifying an output of said eliminating means;
second means for holding a peak level of output of said amplifying means;
means for differentiating an output of said second peak hold means; and
means for comparing an output of said differentiating means with a predetermined reference level.

10. The automatic gain control apparatus of claim 1, wherein said first control signal generating means subtracts said first base signal from said second base signal.

11. The automatic gain control apparatus of claim 1, wherein said error signal comprises a tracking error signal that is generated from said second base signal.

12. An automatic gain control apparatus employed with a recording medium playback system, comprising:
an extractor that extracts a first signal, said first signal being included in a playback signal obtained from a recording medium having a plurality of tracks, said first signal having a highest frequency signal from among a plurality of signals including a track cross component that is produced when a head associated with said recording medium playback system passes a track on which data is recorded;
an amplifier that amplifies said first signal that is extracted by said extractor;
an adder for adding said playback signal to said amplified first signal so as to produce a compensated playback signal;
a peak holder that holes peak level of said compensated playback signal so as to produce a first base signal that includes only said track cross component;
a base signal generator that produces a second base signal that corresponds to a position of said head signal with respect to a track of said recording medium, said second base signal including both said track cross component and a recorded area component;
a control signal generator that produces a first control signal that includes only said recorded area component, based upon said first base signal and said second base signal; and
a gain controller that controls a gain of an error signal in accordance with said first control signal.

13. The automatic gain control apparatus of claim 12, wherein said error signal comprises a tracking error signal that is generated from said second base signal.

14. The automatic gain control apparatus of claim 12, further comprising:
a low-pass filter that passes a low frequency component of said first base signal, said low frequency component of said first base signal being transmitted to said gain controller.

15. The automatic gain control apparatus of claim 12, wherein said recording medium comprises an optical disk and said automatic gain control apparatus further comprises a second control signal generator that produces a second control signal which has a level that corresponds to said head position in a radial direction of said disk and by which an amplification degree of said amplifier is determined.

16. The automatic gain control apparatus of claim 12, wherein said recording medium comprises an optical disk having said tracks, each track including a plurality of sectors, each sector having a pre-format area preceding a user area, said pre-format area having pre-format data recorded thereon, wherein said playback signal includes a pre-format signal in compliance with said pre-format data, said, pre-format signal including a sector mark, a mirror mark and VFO and ID signals which are repeated a predetermined number of time between said sector mark and said mirror mark, said mirror mark having a level that is higher that any other signals included in said pre-format signal, said VFO signals each having a frequency higher that any other signals included in said pre-format signal for use in playing back respective ID signals succeeded thereto.

17. An automatic gain control apparatus employed with a recording medium playback system, comprising:

a head associated with said recording medium playback system that functions retrieve data from a recording medium, a track cross component being produced when said head passes one track of a plurality of tracks on which said data is recorded;

means for producing a compensated playback signal from a retrieved data;

a peak hold unit that holds a peak level of said compensated playback signal, producing a first base signal that contains only said track cross component;

means for producing a second base signal from said track cross component and a recorded area component, said second base signal representing a position of said head with respect to one of said plurality of tracks;

means for producing a first control signal that contains only said recorded area component said first base signal and said second base signal; and a gain controller that uses said first control signal to control a gain of an error signal.

18. The automatic gain control apparatus of claim 17, wherein said error signal comprises a tracking error signal that is generated from said second base signal.

19. The automatic gain control apparatus of claim 17, further comprising:

a low-pass filter that passes a low frequency component of said first base signal, said low frequency component of said first base signal being transmitted to said gain controller.

20. The automatic gain control apparatus of claim 17, wherein said recording medium comprises an optical disk and said automatic gain control apparatus further comprises a second control signal generator that produces a second control signal which has a level that corresponds to said head position in a radial direction of said disk and by which an amplification degree of said amplifier is determined.

21. An automatic gain control apparatus, comprising:

means for producing a compensated playback signal from a retrieved data;

a peak hold unit that holds a peak level of said compensated playback signal, producing a first base signal that contains only a cross component signal;

means for producing a second base signal from said cross component signal and a recorded area component, said second base signal representing a storage position with respect to one of a plurality of storage areas;

means for producing a first control signal that contains only said recorded area component from said first base signal and said second base signal; and a gain controller that uses said first control signal to control a gain of an error signal.

* * * * *

UNITED STATES PATENT AND TRADEMARK OFFICE
CERTIFICATE OF CORRECTION

PATENT NO. : 5,153,865

DATED : October 6, 1992

INVENTOR(S) : T. MINAKUCHI

It is certified that error appears in the above-indentified patent and that said Letters Patent is hereby corrected as shown below:

At column 13, line 6 (claim 4, line 4), change "componenet" to ---component---.

At column 13, line 18 (claim 6, line 4), change "track" to ---tracks---.

At column 13, line 18 (claim 6, line 4), after "each" insert ---track---.

At column 13, line 23 (claim 6, line 9), after "said" delete ---,---.

At column 13, line 26 (claim 6, line 12), change "time" to ---times---.

At column 13, line 28 (claim 6, line 14), change "that" (second occurrence) to ---than---.

At column 13, line 30 (claim 6, line 16), change "that" to ---than---.

At column 14, line 16 (claim 12, line 16), change "holes" to ---holds---.

At column 14, line 56 (claim 16, line 8), after "said" (second occurrence) delete ---,---.

UNITED STATES PATENT AND TRADEMARK OFFICE
CERTIFICATE OF CORRECTION

PATENT NO. : 5,153,865
DATED : October 6, 1992
INVENTOR(S) : T. MINAKUCHI

It is certified that error appears in the above-indentified patent and that said Letters Patent is hereby corrected as shown below:

At column 14, line 59 (claim 16, line 11), change "time" to ---times---.
At column 14, line 61 (claim 16, line 13), change "that" (second occurrence) to ---than---.
At column 14, line 63 (claim 16, line 15), change "that" to ---than---.
At column 15, line 2 (claim 17, line 4), after "functions" insert ---to---.

Signed and Sealed this

Twentieth Day of February, 1996

Attest:

BRUCE LEHMAN

Attesting Officer

Commissioner of Patents and Trademarks